United States Patent [19]

Takemoto et al.

[11] Patent Number: 5,807,177
[45] Date of Patent: Sep. 15, 1998

[54] GAMING MACHINE CHAIR

[75] Inventors: Takatoshi Takemoto; Masayuki Tsurumi, both of Tokyo, Japan

[73] Assignee: Kabushiki Kaisha Ace Denken, Tokyo, Japan

[21] Appl. No.: 362,434

[22] PCT Filed: Jun. 29, 1993

[86] PCT No.: PCT/JP93/00887

§ 371 Date: Apr. 27, 1995

§ 102(e) Date: Apr. 27, 1995

[87] PCT Pub. No.: WO94/00206

PCT Pub. Date: Jan. 6, 1994

[30] Foreign Application Priority Data

Jun. 29, 1992 [JP] Japan ..................................... 4-171229

[51] Int. Cl.[6] .................. A63F 7/02; A63F 9/22
[52] U.S. Cl. .......... 463/47; 463/36; 273/148 B; 297/217.3
[58] Field of Search ............... 273/148 B; 463/1, 463/36, 47; 297/217.1, 411.2, 411.45, 217.3, 463.2

[56] References Cited

U.S. PATENT DOCUMENTS 5,299,810 4/1994 Pierce ..................................... 463/30 X
5,326,104 7/1994 Pease et al. ............................ 273/138

FOREIGN PATENT DOCUMENTS 40 01 838A 7/1991 Germany .
53-53007 5/1978 Japan .
61-48786 4/1986 Japan .
63-135188 6/1988 Japan .
63-311982 12/1988 Japan .
4-32781 3/1992 Japan .
4-171229 6/1992 Japan .
4-128787 11/1992 Japan .
4-336087 11/1992 Japan ................................. 273/121 B
5-31254 2/1993 Japan .
6-47163 2/1994 Japan ................................. 273/121 B
6-54957 3/1994 Japan ................................. 273/121 B

OTHER PUBLICATIONS

Supplementary European Search Report dated Apr. 7, 1997.

*Primary Examiner*—Raleigh W. Chiu
*Attorney, Agent, or Firm*—McDermott, Will & Emery

[57] ABSTRACT

A gaming machine chair comprising a seat (7), a back (8) and and a support member (1a) for supporting them and being installed facing a gaming machine in a gaming house. It comprises at least one armrest (2); an operation section (3) for a player to perform operating instructions for the gaming machine; a card read/write section (6) for taking in and discharging a card and reading and writing information from and into a recording area of the card; and a control section (9) for transferring information to and from the card read/write section and accepting instruction operation from the operation section and sending it to the gaming machine, wherein the operation section (9) and the card read/write section (6) are placed on the armrest (2).

20 Claims, 7 Drawing Sheets

GAMING MACHINE CHAIR

TECHNICAL FIELD

This invention relates to a gaming machine chair placed in front of a gaming machine and in particular to a gaming machine chair in which a player can sit facing the gaming machine in order to play a game.

TECHNICAL BACKGROUND

In a gaming house containing a large number of gaming machines such as Japanese pinball machines (pachinko machines), slot machines, and video game machines, a chair is placed in front of each of the gaming machines. These chairs can turn, but are fixed so that they cannot move from the respective gaming machines. The chairs do not have any special function involved in the process of playing a game.

On the other hand, a gaming machine is provided with an operation section for advancing a game play. The operation section is normally placed on the front of the gaming machine. To play a game, the player must reach with his or her hand to perform any necessary operation on the operation section.

By the way, such a conventional gaming machine chair is placed in front of a gaming machine only for a purpose of enabling a player to sit in the chair. That is, no special consideration is given to easy operation, reduced tiredness, etc., from the player's point of view. Thus, the player sitting in the conventional gaming machine chair must lean forward and reach with his or her hand to operate the gaming machine; in these circumstances, operation is not easy to perform, the player becomes tired, and erroneous operation is prone to occur. Since the spacing between the chair and gaming machine is fixed, some players may feel more tired depending on their physiques.

Further, in a gaming house containing pinball machines, slot machines, etc., a number of gaming machines are placed in a row, thus chairs are placed in a row in front of the gaming machines; players have difficulty concentrating on playing the game. The chair, which is independent of the operation of the gaming machine, has a structure which has difficulty in providing a sense of unity between the player and the playing of the game.

A gaming machine chair as shown in Japanese Patent Laid-Open No. Hei 5-31254 is available. However, the chair disclosed here is one in which a device for actively removing noise is built in, and is not intended for facilitating game play operation.

Thus, the conventional chairs do not enable players to play games comfortably.

DISCLOSURE OF INVENTION

It is therefore a first object of the invention to provide a gaming machine chair which enables a player to easily operate a gaming machine close at hand without leaning forward in a difficult condition which causes tiredness when playing a game.

It is a second object of the invention to provide a gaming machine chair which has a structure enabling a player to easily concentrate on playing a game and to have a sense of unity with the game being played.

To these ends, according to one form of the invention, there is provided a gaming machine chair comprising a seat, a back, and a support member for supporting them and being installed facing a gaming machine in a gaming house, the gaming machine chair characterized by:

at least one armrest;

an operation section for a player to perform operating instructions for the gaming machine;

a card read/write section for taking in and discharging a card and reading and writing information from and into a recording area of the card; and a control section for transferring information to and from the card read/write section and accepting instruction operation from the operation section and sending it to the gaming machine, wherein the operation section and the card read/write section are placed on the armrest.

A support coupled to the bottom of the seat can be provided as the support member. The gaming machine chair of the invention can further include a frame member for coupling to the gaming machine, in which case the support forms a part of the frame member.

The operation section can comprise, for example, at least one of an operation lever and an operation switch for operating the gaming machine and a selection switch for selecting a game, and a volume control. Of course, the operation section can also comprise all of the operation lever and the operation switch for operating the gaming machine and the selection switch for selecting a game.

The operation lever and the operation switch for operating the gaming machine, the selection switch for selecting a game, and the volume control can be placed on the top of the armrest.

The gaming machine chair of the invention can further include a vibration generator contained in the back. The vibration generator is connected to the control section for generating vibration upon reception of a vibration generation command.

The gaming machine chair of the invention can have a loudspeaker mounted on the top of the back. For example, protrusions are formed forward of the chair on the top of the back and the loudspeaker can be mounted on each of the opposed faces of the protrusions.

Such a structure enables the player to remain sitting comfortably in the chair when operating the operation section on the armrest and inserting a card. The player can also play a game without leaning forward or reaching out his or her arm, so that he or she can concentrate on playing the game. Moreover, the player can remain sitting comfortably in the chair while playing a game, thus easily have a sense of unity.

Further, the player sits back in the chair, increasing the contact area between the player's body and the chair. For example, if the chair is provided with a vibration generator for generating proper vibration with the progress of a game, the vibration is reliably transferred to the player. Therefore, the bodily sensations causing the player to actually feel game impacts can be demonstrated efficiently.

Game impact can be improved by producing sound effects on the loudspeakers close to the player. Since separate loudspeakers are placed close to player's ears, a proper sound can be generated at a small volume at each gaming machine and other players are not disturbed. Conversely speaking, each player can enjoy playing the game without being disturbed from noise of other gaming machines and concentrate on his or her game.

The player can also use the volume control for controlling the sound volume of the loudspeakers, so that he or she can listen to sound effects, music, announcements in the gaming house, etc., close to his or her ears at his or her desired volume.

Thus, the gaming machine chair of the invention can provide a game play environment in which the player can comfortably play a game without being forced into an unnatural position and without being disturbed by others.

The display section is provided on the rear of the back. When problems occurs during playing of the game, personnel in the gaming house can be informed on the display section.

BEST MODE FOR CARRYING OUT THE INVENTION

Referring now to the accompanying drawings, there are shown embodiments of the invention.

Figure 2:
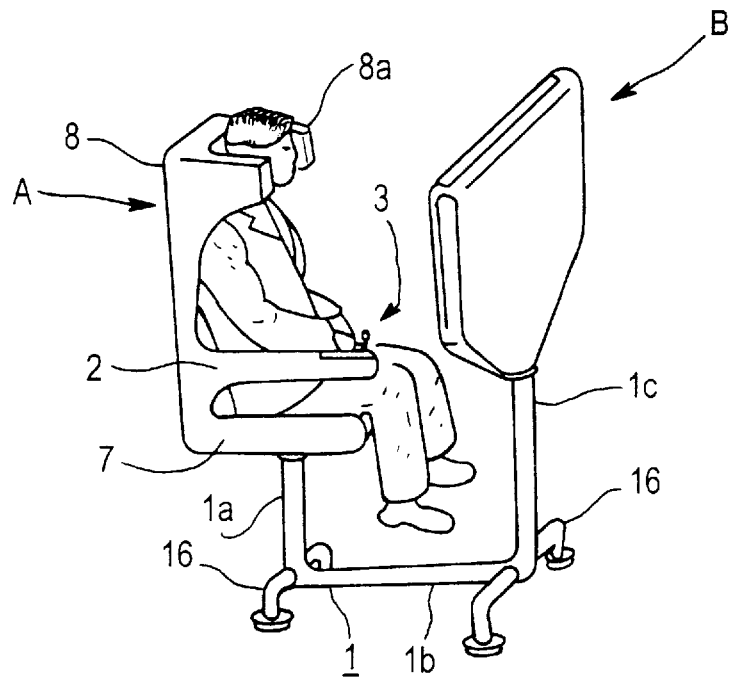
FIG. 2 is a perspective view showing a gaming machine chair of the embodiment in use.

FIG. 2 shows the structure of one embodiment of a gaming machine chair of the invention. The embodiment is an example of a gaming machine chair integrally coupled to a gaming machine.

The embodiment provides a chair A and a gaming machine B having a liquid crystal display, coupled to each other by a pipe frame 1 at their bottoms to form an integral gaming machine and chair unit. The pipe frame 1 comprises a chair support part 1a coupled to the bottom of the chair A for supporting the chair A, a gaming machine support part 1c for supporting the gaming machine B, and a horizontal part 1b for coupling the supports. These parts 1a, 1b, and 1c are formed by bending one pipe in the embodiment. Support legs 16 and 16 are attached to both sides of both ends of the ground side of the frame 1.

In this condition, the integral gaming machine and chair unit can be installed in a gaming house. However, when it is installed in the gaming house, the floor can be made a double floor structure so as to place the horizontal part 1b of the frame 1 and the supporting legs 16 and 16 between the upper and lower floors in order to hide the parts under the upper floor.

A gaming machine having a liquid crystal display is used as the gaming machine B. Different kinds of game software products are provided, among which a player can select and play any desired game. The games include slot machines, card games, othello games, chess, etc., for example.

In the embodiment, the gaming machine B is used mainly as a display section of the gaming machine and a control section 9 provided in the chair controls game software and game progress. Therefore, in the embodiment, the gaming machine chair A and the gaming machine B make up a gaming machine. Of course, the main functional unit of game plays can also be assigned to the gaming machine B.

The gaming machine B may be a gaming machine where players can play only one kind of game.

It may be not only a gaming machine where players play a game in response to an image displayed on a display screen of a liquid crystal display or the like, but also a substantial gaming machine, such as a pinball machine, where players move game play media such as balls in order to play a game.

Figure 1:
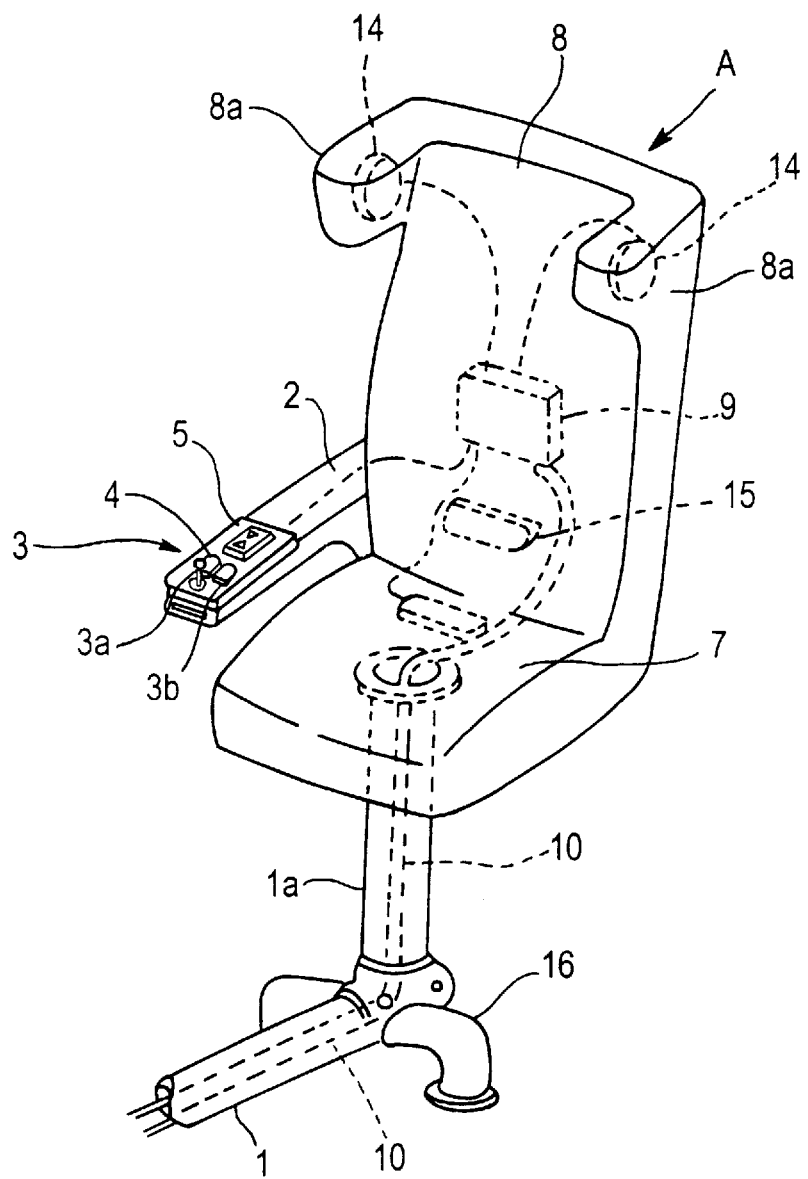
FIG. 1 is a perspective view showing one embodiment of a gaming machine chair of the invention.
Figure 3:
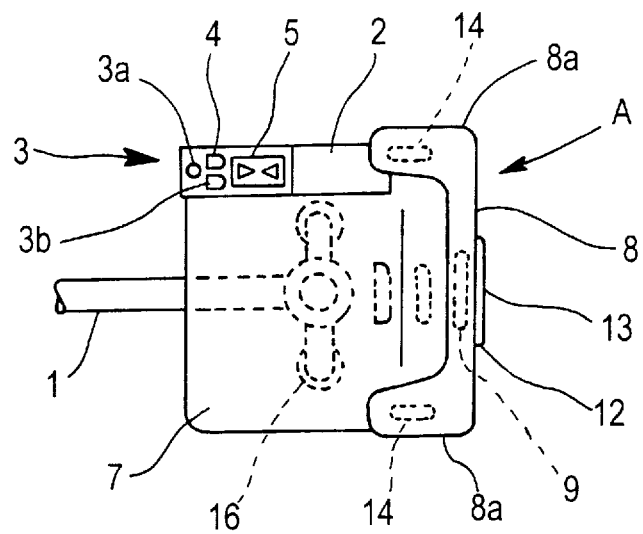
FIG. 3 is a plan view of the gaming machine chair of the embodiment.

The chair A has a seat 7, a back 8 provided in the rear of the seat 7, and an armrest 2 protruding forward from the back 8 on the right of the seat 7, as shown in FIGS. 1 to 3. The back 8 is formed with lugs 8a and 8a, positioned on both sides of a player's head, on both sides of the top of the back 8.

The armrest 2 is provided with an operation section 3 for a player to operate the gaming machine B and a card read/write section 6. The operation section 3 is positioned on the top of the tip of the armrest 2 and the card read/write section 6 is placed under the operation section 3.

Figure 6:
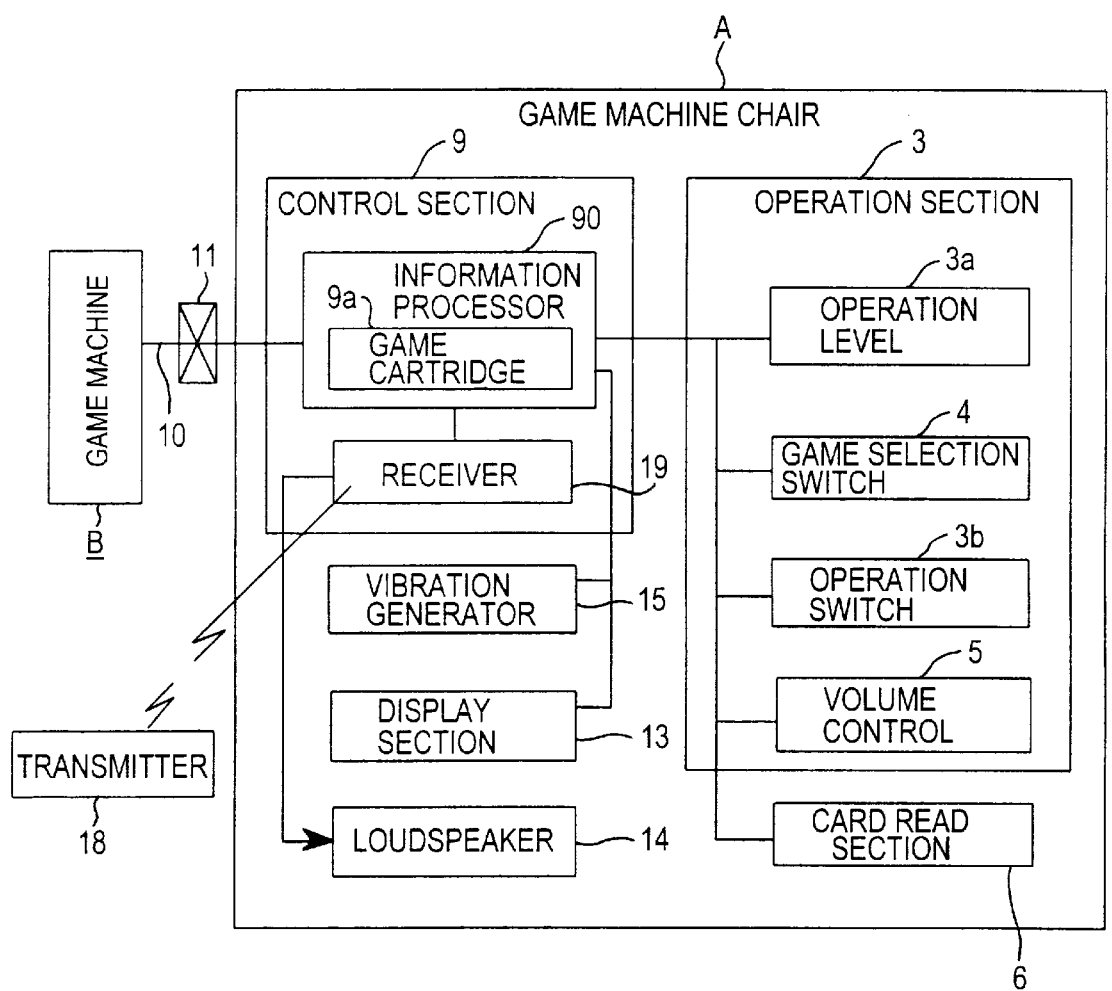
FIG. 6 is a block diagram showing the connection relationship of an operation section, card read/write section, control section, etc., in the embodiment.

The back 8 contains a control section 9 for controlling the gaming machine B and a vibration generator 15. The control section 9 is mounted in the back 8 through an opening on the rear of the back 8. The lugs 8a and 8a each have a loudspeaker 14. Further, a cover 12 (see FIG. 3) is placed over the opening on the rear of the back 8. The cover 12 is provided with a display section 13 indicting the game condition. The loudspeakers 14 are connected to a receiver 19, as shown in FIG. 6.

Figure 4:
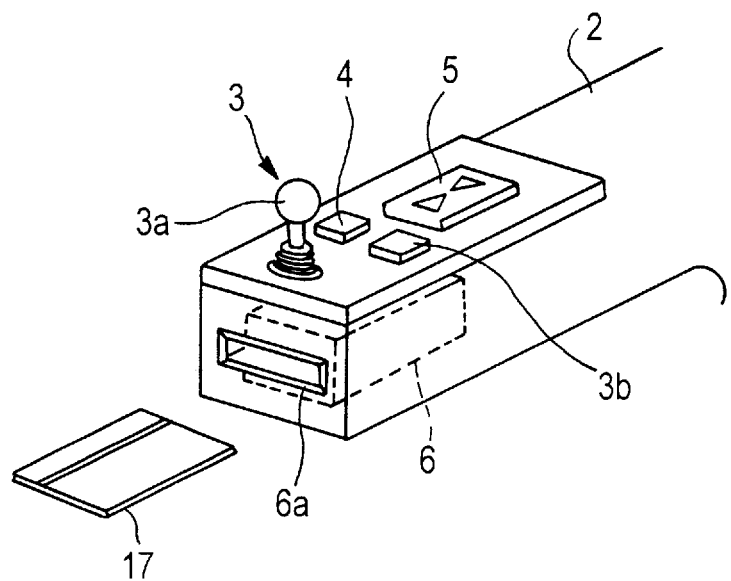
FIG. 4 is a perspective view showing an armrest of the gaming machine chair of the embodiment.

The operation section 3 has an operation lever 3a, an operation switch 3b, a selection switch 4 for selecting a game, and a volume control 5, as shown in FIG. 4. These parts are placed on the top of the armrest 2.

The roles of the operation lever 3a and the operation switch 3b can be defined in response to the game contents for proper use of the lever 3a and the switch 3b. The roles are defined by the control section 9. For example, when the game is a slot machine, the player can use the operation switch 3b to select a bet number line and instruct the gaming machine to start and stop drum rotation. For a game requiring position indication on the display, the player uses the operation lever 3a for position indication. For a pinball machine, the player uses the operation lever 3a to propel pinballs.

The selection switch 4 is a switch used for the player to select a desired game from among provided game software products. In the embodiment, different kinds of game software products are stored in a game cartridge 9a in the control section 9, as described below. The game software may be held in the gaming machine B, in which case a selection signal may be sent to the gaming machine B.

The volume control 5 generates a signal for controlling the sound volume of the loudspeakers 14. The signal is sent to the receiver 19. In the embodiment, if the player presses one end of the volume control, the volume control 5 generates a signal for increasing the sound volume; if the player presses the other end, the volume control 5 generates a signal for decreasing the sound volume.

Figure 5:
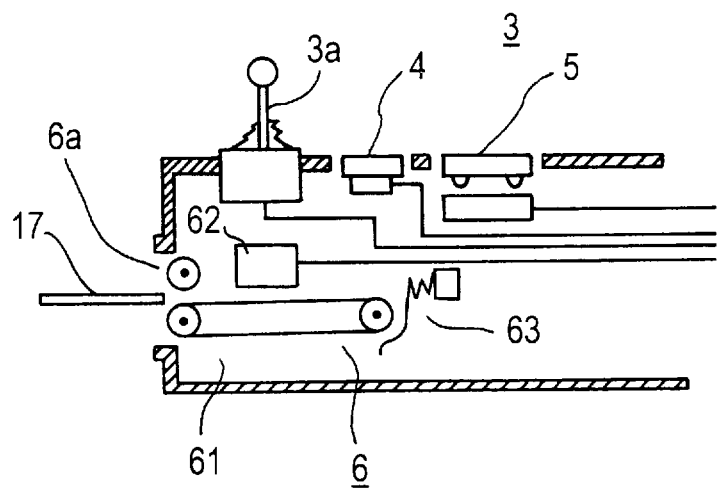
FIG. 5 is a sectional view of the armrest in FIG. 4.

The card read/write section 6 has a transport mechanism 61 consisting of a belt conveyor for transporting a card 17, a read/write head 62 for reading information recorded on the card 17 taken in by means of the transport mechanism and writing information sent from the control section 9 onto the card, and a switch 63 for detecting a condition in which the card 17 is completely taken in and inverting motion of the transport mechanism 61, as shown in FIG. 5. As a card insertion slot, an opening 6a is formed on the tip of the armrest 2.

The card 17 is, for example, a prepaid card, a credit card, or the like, used for paying game play charges. A card specifically for use in the gaming house can also be used as the card 17. That is, a card on which the number of times a player can play a game in the gaming house and the game results can be recorded may be used.

The connection relationship between the operation section 3 and the control section 9 will be discussed. FIG. 6 shows the control system connection relationship in the gaming machine chair A.

As shown in FIG. 6, the control section 9 consists of an information processor 90, a game cartridge 9a for storing game software, and a receiver 19. The receiver 19 receives radio waves transmitted from an external transmitter 18 and transmit them to the loudspeakers 14. Music, an in-house broadcast, an information broadcast, and the like are possible as received information. The receiver 19 changes the reproduced sound volume of the loudspeakers 14 in response to a signal from the information processor 90. The transmitter 18 is placed where appropriate in the gaming house, for example.

Connected to the control section 9 are the operation section 3, the card read/write section 6, the vibration generator 15, the display section 13, and the loudspeakers 14. Also connected to the control section 9 is the gaming machine B via a cable 10 and a connector 11 in the frame 1.

Figure 7:
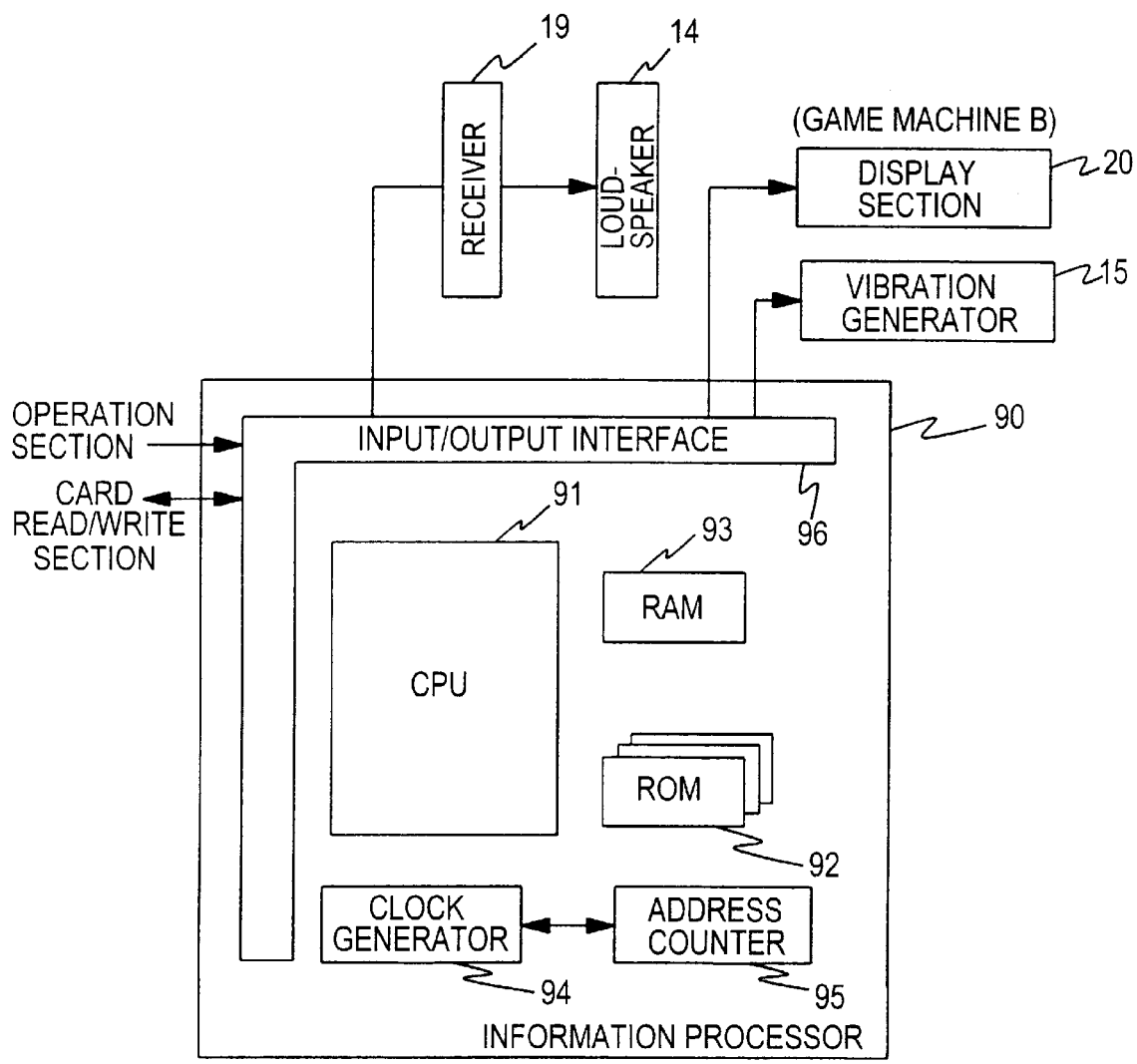
FIG. 7 is a block diagram showing the hardware system configuration of the control section used in the embodiment.

The information processor 90 is made up of a hardware system as shown in FIG. 7, for example. That is, the information processor 90 consists of a central processing unit (CPU) 91 for performing control including instructions given to the gaming machine, game play progress, etc., a plurality of ROMs (read-only memories) 92 for storing programs executed by the CPU 91 and game software, a RAM (random access memory) 93 for storing programs executed by the CPU 91 and temporarily storing data, a clock generator 94 for generating a clock used in the information processor 90, an address counter 95 for generating an address by using the clock, and an input/output interface 96.

Connected to the input/output interface 96 are the operation section 3, the card read/write section 6, the receiver 19 (loudspeaker 14), the vibration generator 15, and the display section 20 of the gaming machine B.

A part of the ROMs 92 is formed as the cartridge 9a for mainly storing game software. The cartridge 9a is removably mounted from the outside. Therefore, the game contents provided at the gaming machine can be changed by replacing the cartridge 9a with another one.

Figure 8:
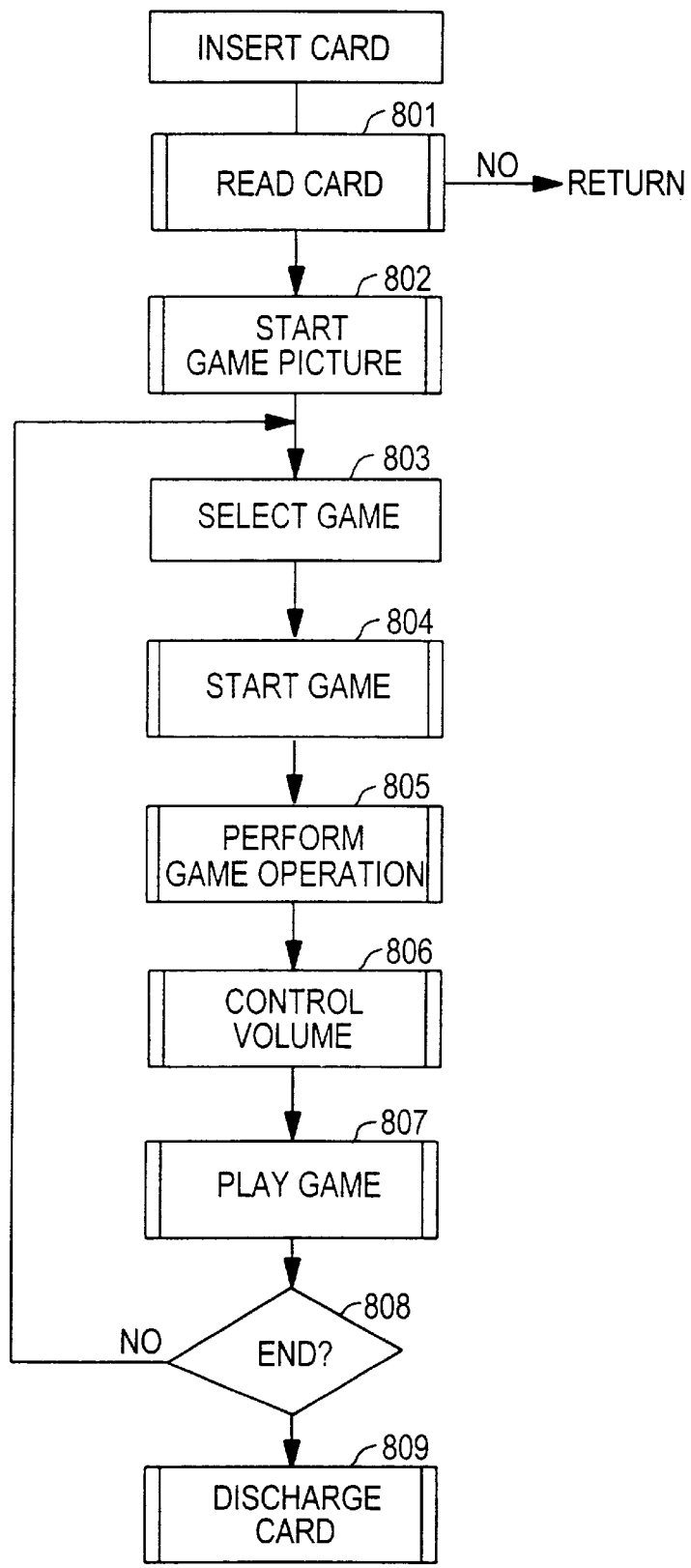
FIG. 8 is a flowchart showing an outline of the control operation of the control section.

Next, the operation of the embodiment will be described with reference to FIG. 8 in addition to the drawings.

First, a player sits in the chair A, as shown in FIG. 2, and inserts a card 17 into the card read/write section 6 through the opening 6a on the tip of the armrest 2. Data read by the card read/write section 6 is input via the input/output interface 96 to the CPU 91, which then determines whether or not the card 17 is valid and checks to see if the remainder meets a required charge. If the card is not valid or the remainder is insufficient to play a game, the CPU 91 instructs the card to be discharged at step 801.

If the card is valid and the remainder is at least one game charge or more, the CPU 91 reads a general game start picture from the ROM 92 and sends it to the display section 20 of the gaming machine B for displaying the picture on the display at step 802. In this case, for example, a game menu is displayed and a message for prompting the player to select any game to play is also displayed on the screen. At this time, how to perform the selection operation is also displayed. For example, a screen is displayed on which the operation section 3 is illustrated to enable the player to operate the selection switch 4 for selecting a target game. At the same time, voice information may be provided through the loudspeakers 14.

Seeing the display, the player operates the selection switch 4 for selecting a game to be played. When the selection switch 4 is operated, selection information is input via the input/output interface 96 to the CPU 91 at step 803, which then selects the game according to the selection information, reads the game contents from the corresponding ROM 92, and sends them to the gaming machine B. Then, the CPU 91 makes the player to start the game and perform operation required for advancing the game at steps 804 and 805. For example, if the gaming machine is a slot machine, a bet is specified. Sound volume control of the loudspeakers 14 is received from the volume control 5 at step 806. While reading the game program from the ROM 92, the CPU 91 advances the game at step 807. While the game is in progress, the CPU 91 instructs the vibration generator 15 to generate vibration for vibrating the chair in accordance with the program. Also, the CPU 91 sends a sound effect signal to the loudspeakers 14 in accordance with the program.

Volume control can be performed not only for sound volume appropriate to the game, but also for other sounds at all times. It is processed in different steps from those shown in the flowchart. As a specific example, it can be performed by interrupt processing.

When the game is over, the CPU 91 determines whether or not the player plays another game. If the player plays another game, the CPU 91 subtracts an amount equivalent to one game charge from the amount information recorded on the card and sends the result to the card read/write section 6 for rewriting the new remainder onto the card. Then, control returns to step 803 at which the player selects a new game to play. The player may remain sitting in the chair for selecting the game by handling the selection switch 4.

If the player does not specify continuation of a game, the CPU 91 subtracts the game charges imposed so far from the amount information to find the remainder and sends the result to the card read/write section 6 for rewriting the new remainder onto the card at step 808. After this, the CPU 91 instructs the card to be discharged at step 809.

Thus, according to the embodiment, the player can operate the operation section 3 conforming to the contents of the gaming machine B with his or her hand on the armrest 2, to play a game. To enjoy playing other games, the player can handle the selection switch 4 for selecting different games. In this case, the player can operate the operation section with his or her body sitting back in the chair, as shown in FIG. 2. This means that they can enjoy playing games while sitting comfortably in the chair without leaning forward or reaching out their arm. Therefore, fatigue is reduced.

Further, the player can listen to a game effect sound from the loudspeakers 14 close to their ears. The player can control the sound volume to a desired level by operating the volume control 5. Thus, they can enjoy playing games without being disturbed by noise from other games and concentrate on their own game. Also, each player at each gaming machine chair can be provided with a sound appropriate to the selected game directly into his or her ears. As a result, the player can easily have a sense of unity with the game.

If a major problem occurs in the gaming house, the announcement of the problem is received at the receiver 19, enabling the player to listen to it from the loudspeakers 14 overriding the game sound effects.

When a malfunction occurs in a gaming machine, whether it occurs in the gaming machine B or the chair A can be determined, or if either of them fails, the connector 11 can be disconnected for replacement. Easy maintenance can also be carried out.

Further, when a problem occurs during game play, personnel in the gaming house can be informed on the display section 13 on the cover 12.

Moreover, in the embodiment, the vibration generator 15 enables the player to play a game comfortably while receiving the bodily sensations promoting the game effects in accordance with the game contents.

Next, another embodiment of the invention will be discussed with reference to FIG. 9.

Figure 9:
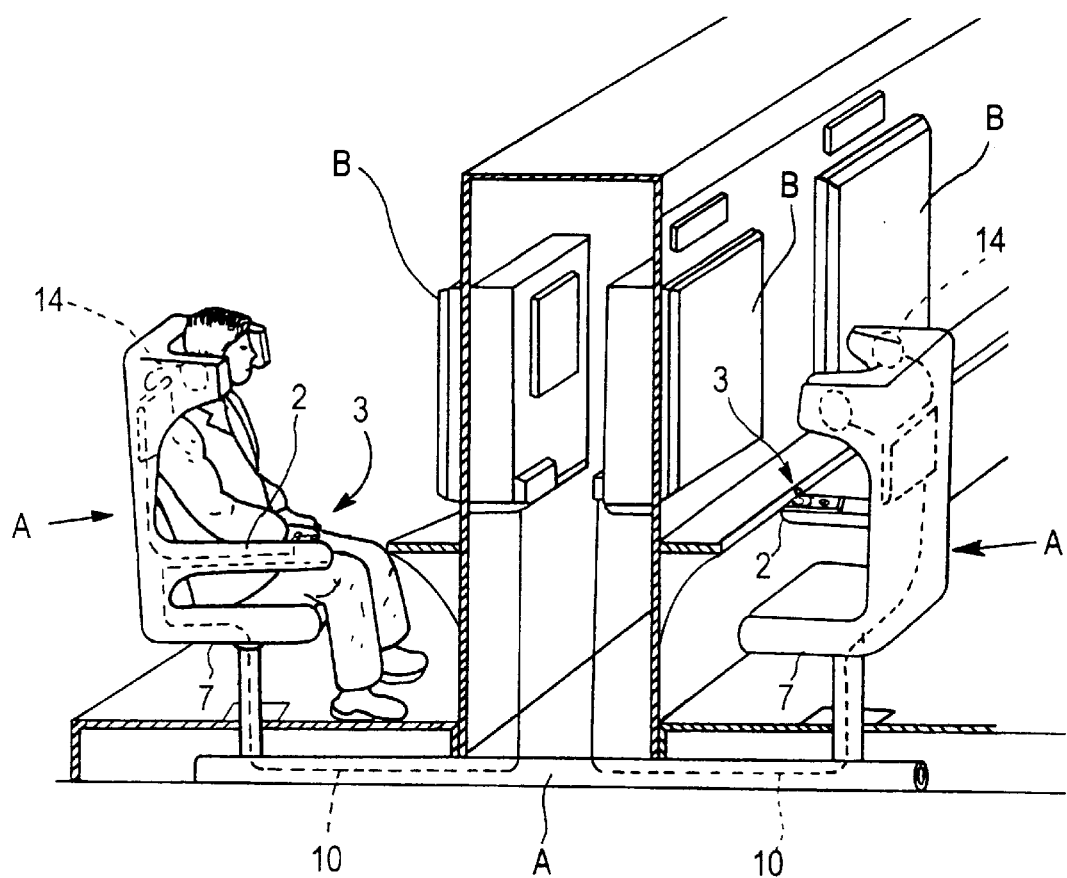
FIG. 9 is a perspective view showing an outline of another embodiment of the invention.

As shown in FIG. 9, the embodiment is an example applied to a gaming house containing a large number of gaming machines B placed side by side in two rows. In the embodiment, the bottoms of chairs A, A placed facing each other with two rows of gaming machines B, B between are coupled by a pipe frame 1 and the gaming machines B, B and the chairs A, A are connected by the frame 1. Other parts are similar to those of the first embodiment discussed above and therefore will not be discussed again.

In the second embodiment, the gaming machine B may be a slot machine, a pinball machine, a gaming machine having a CRT display, or any other similar gaming machine.

In the embodiment, the player can also enjoy playing games easily while sitting back in the chair, as shown in FIG. 9.

By the way, when gaming machines are arranged in a row, one player tends to be another player on the next seat. However, the embodiment provides an environment in which the player can listen to appropriate sound effects close to his or her ears while sitting back in the chair, enabling the player to concentrate on playing the game.

In the embodiments, the chair is coupled to the gaming machine, but the invention is not thus limited. The chair and the gaming machine can be separated from each other.

What is claimed is:

1. A gaming machine chair comprising a seat, a back, and a support member for supporting them and being installed facing a gaming machine in a gaming house, said gaming machine chair characterized by:
   at least one armrest;
   an operation section enabling a player to perform operation instructions corresponding to different games for play on the gaming machine and generating electrical signals to the gaming machine based on the operation instructions;
   a card read/write section for taking in and discharging a card and reading and writing information from and into a recording area of the card; and
   a control section for transferring information to and from said card read/write section and accepting operation instruction from said operation section and sending it to the gaming machine, wherein
   said operation section and said card read/write section are placed on said armrest.

2. The gaming machine chair as claimed in claim 1 including a support coupled to a bottom of the seat as said support member.

3. The gaming machine chair as claimed in claim 2 further including a frame member for coupling to the gaming machine, said support being a part of said frame member.

4. The gaming machine chair as claimed in claim 3 being coupled integrally to a gaming machine display section via said frame member for making up a gaming machine.

5. The gaming machine chair as claimed in claim 3 wherein said control section is contained in the back of said chair and is connected to the gaming machine via a cable and a connector in said frame member.

6. The gaming machine chair as claimed in claim 1 wherein said control section is contained in the back of said chair and is connected to the operation section.

7. The gaming machine chair as claimed in claim 1 further including a vibration generator contained in the back, said vibration generator being connected to said control section for generating vibration upon reception of a vibration generation command.

8. A gaming machine chair being installed facing a gaming machine, comprising:
   a seat, a back and a support member which supports said seat and said back;
   at least one armrest;
   an operation section enabling a player to perform operation instructions for the gaming machine;
   a card read/write section for taking in and discharging a card and reading and writing information from and into a recording area of the card; and
   a control section for transferring information to and from said card read/write section and accepting operation instructions from said operation section and sending the accepted instructions to the gaming machine; wherein said operation section and said card read/write section are provided on said arm rest;
   said control section comprises a cover to be mounted on a rear side of the back; and
   said cover having a display section connected to said control section for indicating a game play condition.

9. The gaming machine chair as claimed in claim 8 further including a loudspeaker mounted on a top of the back.

10. The gaming machine chair as claimed in claim 9 wherein said operation section comprises:
    at least one of an operation lever and an operation switch for operating the gaming machine and a selection switch for selecting a game; and
    a volume control, and wherein
    said control section controls a sound volume of said loudspeaker in response to an instruction of said volume control.

11. The gaming machine chair as claimed in claim 10 including protrusions formed forward of said chair,
    said loudspeaker being mounted on each of opposed faces of said protrusions.

12. The gaming machine chair as claimed in claim 9 herein said operation section comprises:
    an operation lever and an operation switch for operating the gaming machine, a selection switch for selecting a game, and a volume control, and wherein
    said control section controls a sound volume of said loudspeaker in response to an instruction of said volume control.

13. The gaming machine chair as claimed in claim 12 wherein said operation lever and said operation switch for operating the gaming machine, said selection switch for selecting a game, and said volume control are placed on a top of said armrest.

14. The gaming machine chair as claimed in claim 13 including protrusions formed forward of said chair, said loudspeaker being mounted on each of opposed faces of said protrusions.

15. The gaming machine chair as claimed in claim 14 further including a vibration generator contained in the back, said vibration generator being connected to said control section for generating vibration upon receipt of a vibration generation command.

16. The gaming machine chair as claimed in claim 9 further including a receiver for receiving an electromagnetic wave transmitted from an external device, extracting information transmitted on the electromagnetic wave, and sending the information to said loudspeaker.

17. The gaming machine chair as claimed in claim 16 wherein said operation section comprises:

at least one of an operation lever and an operation switch for operating the gaming machine and a selection switch for selecting a game; and a volume control, and wherein said control section controls a sound volume of said loudspeaker in response to an instruction of said volume control.

18. The gaming machine chair as claimed in claim 17 wherein said control section instructs said receiver to control sound volume, and wherein said receiver is responsive to the instruction for controlling the sound volume of said loudspeaker.

19. The gaming machine chair as claimed in claim 16 including protrusions formed forward of said chair, said loudspeaker being mounted on each of opposed faces of said protrusions.

20. A game machine-chair assembly including a game machine for executing a game, a gaming chair being installed facing the gaming machine, comprising:

a seat, a back having a cover and a support member which supports said seat and said back;

at least one armrest;

an operation section enabling a player to perform operation instructions for the gaming machine;

a card read/write section for taking in and discharging a card and reading and writing information from and into a recording area of the card;

a control section for transferring information to and from said card read/write section and accepting operation instructions from said operation section and sending the received instructions to the gaming machine, wherein said operation section and said card read/write section are provided on said armrest;

said cover having a display section connected to said control section for indicating a game play condition.

* * * * *